United States Patent [19]
Hidai et al.

[11] Patent Number: 5,779,023
[45] Date of Patent: Jul. 14, 1998

[54] SORTING CONVEYOR APPARATUS

[75] Inventors: Masatoshi Hidai, Utsunomiya; Tsutomu Miura, Mibu-machi, both of Japan

[73] Assignee: Rheon Automatic Machinery Co., Ltd., Japan

[21] Appl. No.: 840,192

[22] Filed: Apr. 11, 1997

[30] Foreign Application Priority Data

Apr. 17, 1996 [JP] Japan .................................. 8-095508

[51] Int. Cl.⁶ .................................. B65G 47/30
[52] U.S. Cl. .................. 198/418.1; 198/432; 198/460.1; 198/460.3
[58] Field of Search .............. 198/460.1, 461.1, 198/575, 464.2, 464.3, 419.2, 460.3, 462.1, 418.1, 432

[56] References Cited

U.S. PATENT DOCUMENTS

| | | | |
|---|---|---|---|
| 3,075,630 | 1/1963 | Fisk | 198/460.1 |
| 4,640,408 | 2/1987 | Eaves | 198/575 |
| 4,653,630 | 3/1987 | Bravin | 198/460.1 |
| 4,881,635 | 11/1989 | Raschke | 198/460 |
| 5,147,027 | 9/1992 | Cruver | 198/418.1 |

FOREIGN PATENT DOCUMENTS

| | | |
|---|---|---|
| A1 01866986 | 12/1985 | European Pat. Off. |
| 0 485 845 A1 | 11/1991 | European Pat. Off. |
| 97 30 2644 | 7/1997 | European Pat. Off. |
| 80-002521 | 3/1980 | Japan . |
| 85-161820 | 12/1985 | Japan . |
| 87-153016 | 12/1987 | Japan . |
| 1 473 721 | 7/1974 | United Kingdom . |

*Primary Examiner*—Joseph E. Valenza
*Assistant Examiner*—Joe Dillon
*Attorney, Agent, or Firm*—Klarquist Sparkman Campbell Leigh & Whinston, LLP

[57] ABSTRACT

A sorting conveyor apparatus of the present invention is structured such that when objects to be conveyed are respectively positioned in outlet sides of upstream sorting conveyors under a condition that the objects are positioned on each of downstream sorting conveyors, driving of the upstream sorting conveyors is stopped, such that when the objects are carried out from outlet sides of the downstream sorting conveyors, the driving of the upstream sorting conveyors are respectively restarted, such that when the objects are respectively positioned in the outlet side of each of the downstream sorting conveyors, the driving of each of the downstream sorting conveyors is stopped, and such that the driving of all the downstream sorting conveyors is synchronously restarted under a predetermined carry out condition.

8 Claims, 9 Drawing Sheets

SORTING CONVEYOR APPARATUS

BACKGROUND OF THE INVENTION

1. Field of the Invention

The present invention relates to a sorting conveyor apparatus for conveying a large number of objects including food products such as breads and sweet stuffs, products other than foods and the like in a transverse direction which is a conveying direction and an inverse direction of the conveying direction under a condition that the objects are arranged in the transverse direction and at the same time continuously sorting the objects to be conveyed into a plurality of groups in a line in a longitudinal direction which is perpendicular to the transverse direction during conveyance.

2. Description of the Related Art

The related art of the sorting conveyor apparatus will be briefly explained hereinbelow.

In the sorting conveyor apparatus of the related art, a plurality of conveyors are provided at appropriate positions in such a manner as to extend to a transverse direction which is a conveying direction and an inverse direction of the conveying direction. And the plurality of conveyors provide a plurality of conveying areas for conveying many objects to be conveyed under a condition that the objects are arranged in rows parallel to the transversal direction in a longitudinal direction which is perpendicular to the transverse direction. Further, a sorting shutter extending in the longitudinal direction is provided above an intermediate portion of a belt in the conveyor so as to move upward and downward, the sorting shutter against which the objects to be conveyed comprising a plurality of products generally bump from the conveying direction. Accordingly, many objects to be conveyed are transported to the conveying direction under a plurality of rows in a transverse direction by driving the conveyor. And repeatedly reciprocating the shutter in the upward and downward directions during the conveyance, the objects to be conveyed from the upward bump against the shutter and are continuously sorted into a plurality of groups in a longitudinal direction.

However, the conventional sorting conveyor apparatus has a problem that the soft object to be conveyed such as a bread like sweet stuff and a rice cake is deformed and adheres to the sorting shutter so that a quality of the object to be conveyed is injured because the objects to be conveyed are bumped against the shutter so as to sort the objects into the groups in a longitudinal direction.

Further, there is another problem that a temporary stop of conveying the objects due to bumping against the sorting shutter cause an interference between the objects bumped against the sorting shutter and the next objects conveyed from upward so that sorting becomes difficult.

Furthermore, in the case that a distance between the objects to be sorted in the longitudinal direction and the objects already sorted in the downward side is small, there is a problem that the sorting shutter can not be inserted between the adjacent objects to be conveyed so that sorting can not be performed.

SUMMARY OF THE INVENTION

The present invention aims to solve the above described problems and a primary object of the present invention is to provide a sorting conveyor apparatus capable of maintaining a quality of objects to be conveyed by preventing the objects to be conveyed from being deformed.

Another object of the present invention is to prevent the objects to be conveyed from being interfered to each other due to conveyance.

Still another object of the present invention is to sort the objects to be conveyed even in the case that a distance between the adjacent objects to be conveyed in the conveying direction is small.

To achieve the objects according to a first aspect of the invention, there is provided a sorting conveyor apparatus for continuously sorting objects to be conveyed into groups and conveying the objects comprising: a first conveyor disposed upstream of a transverse direction for conveying the objects, the first conveyor having a plurality of first conveying areas for conveying a lot of objects under a condition of rows in the transverse direction, in a longitudinal direction which is crossed to the transverse direction a second conveyor disposed downstream of the transverse direction, the second conveyor having a plurality of second conveying areas for conveying a lot of objects under a condition of rows in the transverse direction, in the longitudinal direction; a sorting conveyors set disposed between the first conveyor and the second conveyor, the sorting conveyors set having a plurality of upstream sorting conveyors disposed in the longitudinal direction and a plurality of downstream sorting conveyors disposed in the longitudinal direction, the plurality of upstream sorting conveyors corresponding to the plurality of first conveying areas of the first conveyor in the longitudinal direction and the plurality of downstream sorting conveyors corresponding to the plurality of second conveying areas of the second conveyor in the longitudinal direction; and a control device for individually controlling the plurality of upstream sorting conveyors and the plurality of downstream sorting conveyors, wherein the control device controls in such a manner as to stop driving of each of the upstream sorting conveyors disposed adjacent in the transverse direction when each of the objects is positioned in outlet sides of the upstream sorting conveyors disposed adjacent in the transverse direction under a condition that the objects are positioned on the plurality of respective downstream sorting conveyors and to restart driving of each of the adjacent upstream sorting conveyors again when each of the objects is carried out from outlet sides of the downstream sorting conveyors, and the control device also controls in such a manner as to stop driving of each of the downstream sorting conveyors when each of the objects is positioned in the outlet sides of the plurality of downstream sorting conveyor and to synchronously restart driving of all the downstream sorting conveyors under a predetermined carry out condition.

In this aspect, the case that the objects to be conveyed are positioned on the sorting conveyor near the downstream side includes the case that the objects to be conveyed are positioned between the inlet side and the outlet side of the downstream sorting conveyor as well as the case that the objects to be conveyed are positioned at the inlet side of the downstream sorting conveyor or at the outlet side thereof.

In accordance with driving the first conveyor by the means described above, a lot of objects to be conveyed can be conveyed to the conveying direction under the condition that the objects are arranged in a plurality of transverse rows and can be brought into the inlet side of the most upstream sorting conveyor corresponding to the first conveyor from the outlet side of the first conveying area, respectively. Then, in accordance with optionally driving the plurality of sorting conveyors of each sorting conveyors set, a lot of objects to be conveyed can be continuously conveyed from the inlet side of the most downstream sorting conveyor to the outlet side of the corresponding most upstream sorting conveyor.

When the objects to be conveyed are respectively positioned on the outlet side of the upstream sorting conveyors adjacently arranged in the transverse direction in the condition that the objects to be conveyed are respectively positioned on each of the downstream sorting conveyors during the conveyance steps by the above described sorting conveyors, the control device controls to respectively stop driving the above described adjacent upstream sorting conveyors and thereafter when the objects to be conveyed are carried out from the outlet side of the above described downstream sorting conveyors, the control device controls to respectively drive the above described adjacent upstream sorting conveyors again. In accordance with this, two or more objects to be conveyed can not exist on the respective downstream sorting conveyors, especially, in the structure defining the second means, two or more objects to be conveyed can not exist on the respective sorting conveyors.

The objects to be conveyed can be continuously sorted into a plurality of groups in the longitudinal direction without being bumped against the sorting shutter and the like by stopping the respective most downstream sorting conveyor when the objects to be conveyed are positioned in the outlet side of the most downstream sorting conveyors in the respective conveyors set and by synchronously driving all the most downstream sorting conveyor again under the predetermined condition for carrying out. Accordingly, if the objects to be conveyed are soft, the objects can be prevented from deforming by sorting and a quality of the objects can be maintained. Further, even if the transverse distance between the adjacent groups of the objects to be conveyed is small in the first conveyor, sorting in the longitudinal direction can be certainly performed.

When the objects to be conveyed are respectively positioned in the outlet side of the upstream sorting conveyor adjacently disposed in the transverse direction in the case that the objects to be conveyed are respectively positioned on each of the downstream sorting conveyor in the respective conveyors set, the above described upstream sorting conveyors adjacently disposed are stopped and thereafter when the objects to be conveyed are respectively carried out from the outlet side of the above described downstream sorting conveyor, the above described upstream sorting conveyors adjacently disposed are respectively driven again so that two or more objects to be conveyed do not exist on the respective downstream sorting conveyors. Accordingly, the objects to be conveyed can be prevented from interfering to each other on the sorting conveyor, the sorting operation can be improved and the quality of the objects to be conveyed can be maintained. Especially, in accordance with the structure stated in claim 2, the interference between the adjacent objects to be conveyed can be certainly prevented and the above effects can be further improved.

According to a second aspect of the invention, as it depends from the first aspect, a conveying time for conveying the objects from an inlet side to the outlet side of the upstream and downstream sorting conveyors is shorter than a conveying time required for a minimum conveying pitch between the objects in the first conveying areas.

According to a third aspect of the invention, as it depends from the first or second aspects, the sorting conveyor apparatus further comprises an arithmetic device for operating respective average pitch times required for average conveying pitches of the objects in each of the first conveying areas, wherein the predetermined carry out condition is to drive all the most downstream sorting conveyors at a predetermined time period not longer than the shortest average pitch time among a plurality of average pitch times.

In this description, a predetermined time interval which is not more than the shortest average pitch time among a plurality of average pitch times for all the most downstream sorting conveyor includes a time interval which is almost equal to the shortest average pitch time.

Further, the third aspect may be structured such that detecting sensors for detecting the objects to be conveyed in each of the first conveying area are respectively provided and the arithmetic units respectively operate the average conveying pitch time based on the detected time intervals detected by the respective detecting sensor.

In accordance with the third aspect, since the respective groups of objects to be conveyed are continuously carried out under the predetermined time interval which is not more than the shortest average pitch time, even in the case that the conveying pitches between the objects to be conveyed in one of the first conveying areas are not equal to each other along the transverse direction or in the case that the conveying pitches for each of the first conveying areas are not equal to each other, the respective groups of objects to be conveyed can be continuously and certainly carried out from the sorting conveyor and a lot of groups of objects to be conveyed can be conveyed at a predetermined conveying pitch substantially equal to each other in the second conveyor. Accordingly, an after treatment to the objects to be conveyed in the second conveyor can be improved.

According to a fourth aspect of the invention, as it depends from the first or second aspects, the predetermined carry out condition is to drive all the most downstream sorting conveyors when the objects are positioned in outlet sides of the first conveying areas corresponding to any of a plurality of most upstream sorting conveyors under a condition that the objects are positioned on the any of the most upstream sorting conveyors.

In this description, the outlet side of the first conveying area corresponding to any of the most upstream sorting conveyor includes the outlet side of the first conveying area transversely disposed adjacent any of the most upstream sorting conveyor.

Further, the case that the objects to be conveyed are positioned in the most upstream sorting conveyor includes the case that the objects to be conveyed are positioned between the inlet side and the outlet side of the most upstream sorting conveyor as well as the case the objects to be conveyed are positioned at the inlet side or the outlet side of the most upstream sorting conveyor.

In the above described structure, since the objects to be conveyed are carried out when the objects to be conveyed are positioned in any of the most upstream sorting conveyor and are positioned in the outlet side of the corresponding first conveying area, even if the conveying pitches between the objects to be conveyed in one of the first conveying areas are not equal to each other along the transverse direction or the conveying pitches for the respective first conveying area are not equal to each other, the respective groups of objects to be conveyed can be certainly and continuously conveyed and sorted, a time period from the time that any of the most downstream sorting conveyors firstly stop conveying to the time that all the most downstream sorting conveyors synchronously start conveying again becomes long so that the frequency that the objects to be conveyed can be kept in the outlet side of all the most downstream sorting conveyor becomes high. Accordingly, the case that the groups of objects to be conveyed carried out to the second conveyor comprise one object to be conveyed may be limited so that after treatment of the objects to be conveyed in the second conveyor may be improved.

According to a fifth aspect of the invention, as it depends from the first or second aspects, the predetermined carry out condition is to drive all the most downstream sorting conveyors when the objects are respectively positioned in the outlet sides of all the sorting conveyor.

In the above structure, since the objects to be conveyed are carried out when the objects to be conveyed are respectively positioned in the outlet side of all the sorting conveyor, the objects to be conveyed can be carried out to the second conveyor at each of the groups of the objects under the substantially equal time intervals and a lot of groups of objects to be conveyed can be conveyed in the second conveyor under the substantially equal conveying pitches only in the case that the conveying pitch between the objects to be conveyed in one of the first conveying areas is substantially equal along the transverse direction and the conveying pitch for each of the first conveying area is substantially equal. Accordingly, the after treatment of the objects to be conveyed in the second conveyor can be improved.

According to a sixth aspect of the invention, as it depends from one aspect among the first to fifth aspects, the sorting conveyor apparatus further comprises: a sorting conveyor brought in detector for detecting whether or not the objects are positioned in the inlet side of each of the sorting conveyors; a sorting conveyor carry out detector for detecting whether or not the objects are positioned in the outlet side of each of the sorting conveyors; a first conveying areas carry out detector for detecting whether or not the objects are positioned in an outlet side of each of the first conveying areas; and a second conveying areas carry out detector for detecting whether or not the objects are positioned in an inlet side of each of the second conveying areas.

As an alternative to the sixth aspect, the outlet side of each of the sorting conveyors and the inlet side of the sorting conveyor disposed adjacent in the transverse direction may be arranged in close vicinity to each other, the outside of each of the first conveying area and the inlet side of the most upstream sorting conveyor disposed adjacent in the transverse direction may be arranged in close vicinity to each other, and the inlet side of each of the second conveying area and the outlet side of the most downstream sorting conveyor disposed adjacent in the transverse direction may be arranged in close vicinity to each other.

In the sixth aspect described above, whether or not the objects to be conveyed are positioned in the inlet side or the outlet side of the downstream sorting conveyor is determined by an appropriate detector for detecting the bringing in the sorting conveyor which detect the objects to be conveyed. The case that the objects to be conveyed are positioned between the inlet side and the outlet side of the downstream sorting conveyor is determined by that the objects to be conveyed are detected by the appropriate bringing in detector for the sorting conveyor and thereafter the same objects are not detected by the appropriate bringing out detector for the sorting conveyor. Further, the case that the objects to be conveyed are positioned in the outlet side of the upstream sorting conveyor is determined by that the objects to be conveyed are detected by the appropriate bringing out detector for the sorting conveyor, and the case that the objects to be conveyed are carried out from the outlet side of the downstream sorting conveyor is determined by that the objects to be conveyed becomes not to be detected by the appropriate bringing out detector for the sorting conveyor.

The control device controls the sorting conveyors in such a manner that the most downstream conveyor is stopped when the objects to be conveyed are positioned in the outlet side of the most downstream sorting conveyor in the each sorting conveyors set, and the control device synchronously drives all the most downstream sorting conveyor again under the predetermined bringing out condition. By repeatedly performing this operation, the objects to be conveyed are continuously sorted into some groups and the groups of the objects are continuously carried out from the outlet side of the most downstream sorting conveyor. The groups of objects to be conveyed are continuously brought in the second conveyor after being carried out from the most downstream sorting conveyor, and are conveyed to the conveying direction on the second conveyor.

On the other hand, the case that the objects to be conveyed are positioned in the inlet side or the outlet side of the most upstream sorting conveyor is determined by that the objects to be conveyed are detected by the appropriate bringing in detector for the sorting conveyor or the appropriate bringing out detector for the sorting conveyor, and the case that the objects to be conveyed are positioned between the inlet side and the outlet side of the most upstream sorting conveyor is determined by that the objects to be conveyed are detected by the appropriate bringing in detector for the sorting conveyor and the same objects are not detected by the appropriate bringing out detector for the sorting conveyor. Further, the case that the objects to be conveyed are positioned in the outlet side of the first conveying area is determined by that the objects to be conveyed are detected by an appropriate bringing out detector for the first conveying area.

Further, in the sixth aspect, the bringing out detector for the sorting conveyor which detects whether or not the objects to be conveyed are positioned in the outlet side of each of the sorting conveyors, can serve as the bringing in detector for the sorting conveyor which detects whether or not the objects to be conveyed are positioned in the inlet side of the sorting conveyor disposed adjacent in the transverse direction. Further, the bringing out detector for the first conveying area which detects whether or not the objects to be conveyed are positioned in the outlet side of each of the first conveying area can be used as the bringing in detector for the sorting conveyor which detects whether or not the objects to be conveyed are positioned in the inlet side of the most upstream sorting conveyor disposed adjacent in the transverse direction. Furthermore, the bringing out detector for the sorting conveyor which detects whether or not the objects to be conveyed are positioned in the outlet side of the most downstream sorting conveyor can be used as the bringing in detector for the second conveying area which detects whether or not the objects to be conveyed are positioned in the inlet side of the second conveying area disposed adjacent in the transverse direction.

According to a seventh aspect of the invention, as it depends from one aspect among the first to sixth aspects, the sorting conveyor apparatus further comprises: a plurality of upstream side variable speed conveyors disposed between the first conveyor and the plurality of most upstream sorting conveyors in the longitudinal direction, wherein each of the upstream side variable speed conveyors are structured in such a manner as to be disposed between the corresponding first conveying area and the most upstream sorting conveyor and a conveying speed of each of the upstream side variable speed conveyors can be switched between a speed substantially equal to a conveying speed of the first conveyor and a speed substantially equal to a conveying speed of the most upstream sorting conveyor.

In the above structure, a conveying speed of the corresponding (disposed adjacent in the transverse direction)

upstream side variable speed conveyor is switched to a speed substantially equal to a conveying speed of the first conveyor before the objects to be conveyed are carried out from the outlet side of each of the first conveying area, and the objects to be conveyed are brought in the inlet side of the upstream side variable speed conveyor. And the conveying speed of the upstream side variable speed conveyor is switched to a speed substantially equal to a conveying speed of the most upstream sorting conveyor before the objects to be conveyed are carried out from the outlet side of each of the upstream side variable speed conveyor, and the objects to be conveyed are brought in the inlet side of the most upstream sorting conveyor.

In accordance with the seventh aspect, since the conveying speed of the objects to be conveyed is not changed at the time of inter-motion between the first conveyor and the sorting conveyor, a deformation of the objects to be conveyed between the conveyors can be prevented and the quality of the objects to be conveyed are maintained even if the objects to be conveyed are soft.

According to a eighth aspect of the invention, as it depends from one aspect among the first to sixth aspects, the sorting conveyor apparatus further comprises: a plurality of downstream side variable speed conveyors disposed between the second conveyor and the plurality of most downstream sorting conveyors in the longitudinal direction, wherein each of the downstream side variable speed conveyors are structured in such a manner as to be disposed between the corresponding second conveying area and the most downstream sorting conveyor and a conveying speed of each of the downstream side variable speed conveyors can be switched between a speed substantially equal to a conveying speed of the second conveyor and a speed substantially equal to a conveying speed of the most downstream sorting conveyor.

In the above structure, the conveying speed of the corresponding (disposed adjacent in the transverse direction) downstream side variable speed conveyor is switched to a speed substantially equal to the conveying speed of the most downstream sorting conveyor before the objects to be conveyed are carried out from the outlet side of each of the most downstream sorting conveyor, and the objects to be conveyed are brought in the inlet side of the downstream side variable speed conveyor. And the conveying speed of the downstream side variable speed conveyor is switched to a speed substantially equal to the conveying speed of the second conveyor before the objects to be conveyed are carried out from the outlet of each of the downstream side variable speed conveyor, and the objects to be conveyed are brought in the inlet side of the corresponding second conveying area disposed adjacent in the transverse direction.

In accordance with the eighth aspect, since the conveying speed of the objects to be conveyed is not changed at the time of inter-motion between the sorting conveyor and the second conveyor, a deformation of the objects to be conveyed between the conveyors can be prevented and the quality of the objects to be conveyed are maintained even if the objects to be conveyed are soft. Further, even if the conveying speed of the sorting conveyor is significantly slower than that of the second conveyor, the objects to be conveyed can be carried out to the second conveyor at a speed substantially equal to the conveying speed of the second conveyor, thereby making the conveying pitch between a lot of groups of objects to be conveyed in the second conveyor so that the after treatment of the objects to be conveyed in the second conveyor can be improved.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
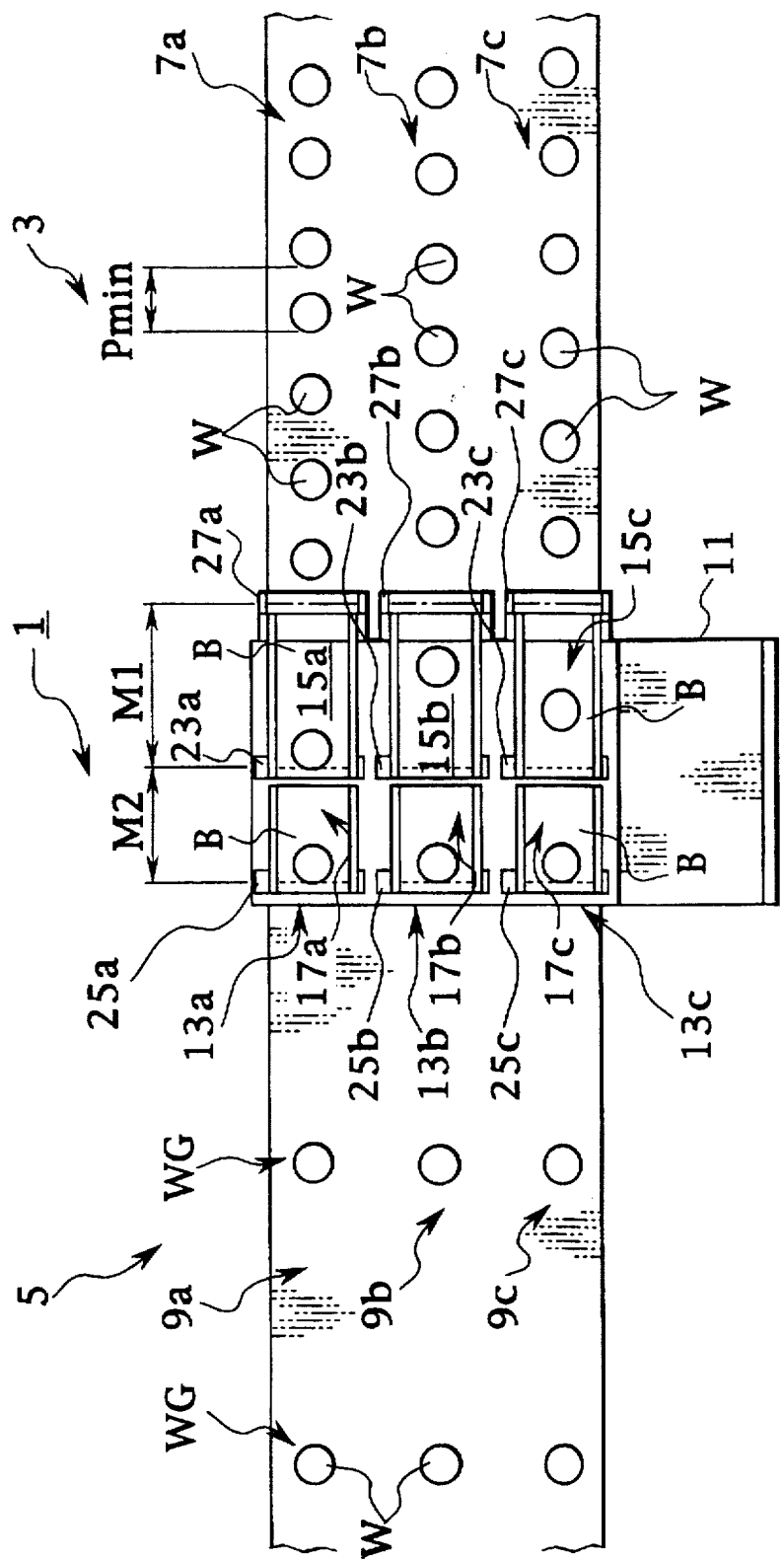
FIG. 1 is a plan view showing a sorting conveyor apparatus in accordance with a first embodiment of the present invention.

There will be detailed below the preferred embodiments of the present invention with reference to the accompanying drawings. Like members are designated by like reference characters.

Figure 2:
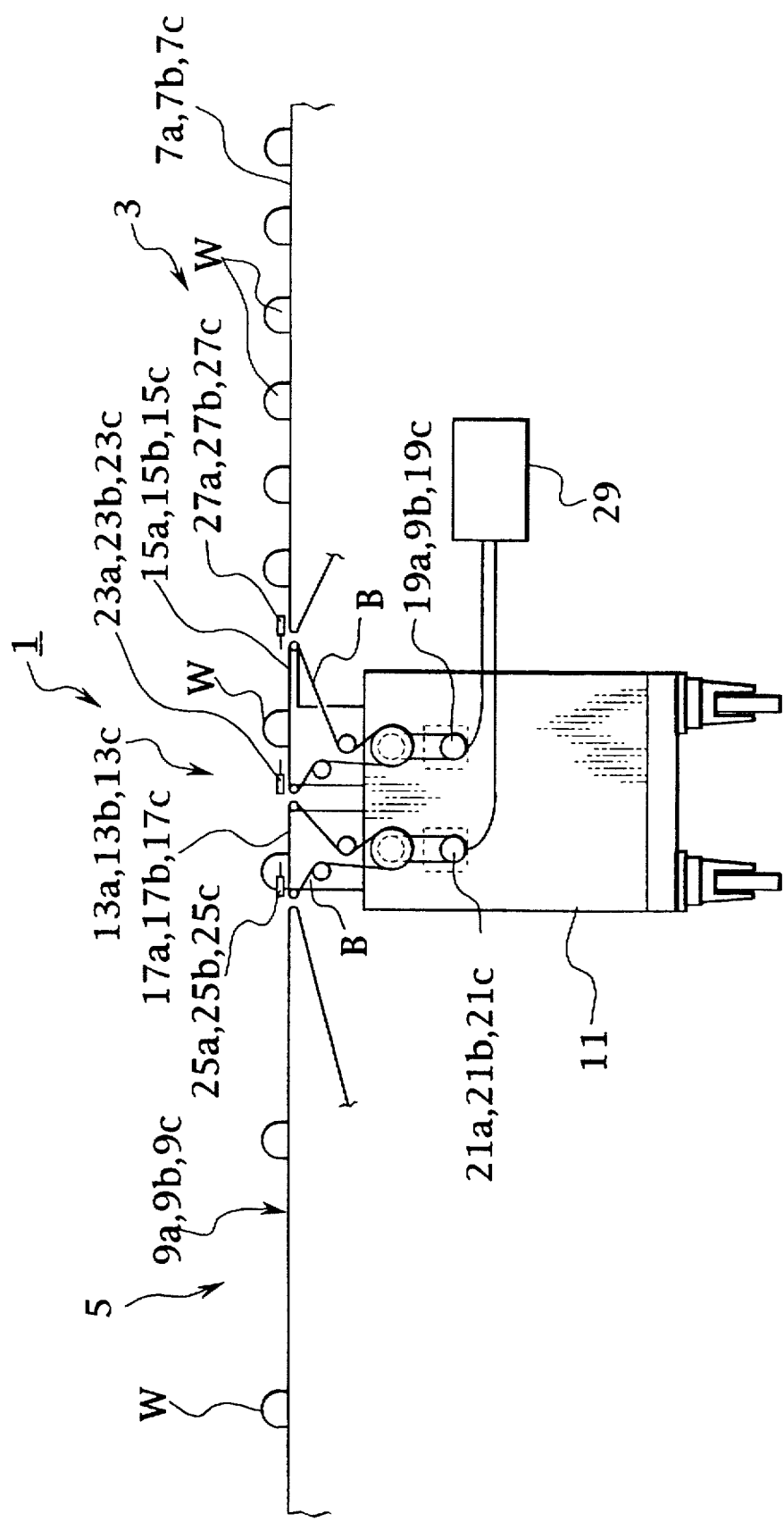
FIG. 2 is a front view showing a sorting conveyor apparatus in accordance with the first embodiment of the present invention.

Referring to FIGS. 1 and 2, a sorting conveyor apparatus 1 in accordance with a first embodiment of the present invention conveys a large number of objects to be conveyed including food products such as breads and sweet stuffs, food materials and the like in a transverse direction which is a conveying direction and an inverse direction of the conveying direction under a condition that the objects are arranged in a plurality of columns and rows with respect to the transverse direction, that is, a right and left direction in FIGS. 1 and 2 and during conveyance at the same time continuously sort the objects to be conveyed into a plurality of groups WG in a longitudinal direction which is perpendicular to the transverse direction, that is, an up and down direction in FIG. 1 and an inside and outside direction in FIG. 2. Detailed explanation will be given with respect to the sorting conveyor apparatus 1 as follow.

A first conveyor 3 is provided in an upstream side with respect to the conveying direction of the objects W to be conveyed and a second conveyor 5 is provided in a downstream side with respect to the conveying direction. The first conveyor 3 has a plurality of first conveying areas 7a, 7b and 7c in a longitudinal direction which convey a lot of objects W to be conveyed under the condition of transverse rows and the second conveyor 5 has a plurality of second conveying areas 9a, 9b and 9c in a longitudinal direction which convey a lot of objects W to be conveyed under the condition of transverse rows.

A sorting conveyors sets body 11 is provided between the first conveyor 3 and the second conveyor 5, the sorting conveyors sets body 11 is provided with a plurality of sorting conveyors sets 13a, 13b and 13c in the longitudinal direction and each of the sorting conveyors sets 13a, 13b and 13c is structured to be arranged between the corresponding first conveying areas 7a, 7b and 7c and the second conveying areas 9a, 9b and 9c. The sorting conveyors sets 13a, 13b and 13c are respectively provided with upstream sorting conveyors 15a, 15b and 15c disposed adjacent in the transverse direction and corresponding downstream sorting conveyors 17a, 17b and 17c, and upstream sorting conveyor driving motors 19a, 19b and 19c for driving belts B in the respective upstream side conveyors 15a, 15b and 15c in the conveying direction and downstream sorting conveyor driving motors 21a, 21b and 21c for driving belts B in the respective downstream sorting conveyors 17a, 17b and 17c in the conveying direction are provided in appropriate positions in the sorting conveyors sets body 11.

In this structure, a conveying length M1 from an inlet side to an outlet side of the upstream sorting conveyors 15a, 15b and 15c, a conveying time $T_1$ required for conveying the objects W in the upstream side conveyors 15a, 15b and 15c, a conveying length M2 from an inlet side to an outlet side of the downstream sorting conveyors 17a, 17b and 17c and a conveying time $T_2$ required for conveying the objects W in the downstream side conveyors 17a, 17b and 17c are respectively structured to be shorter than a conveying time Tmin required for a minimum conveying pitch Pmin between the adjacent objects W in the first conveying areas 7a, 7b and 7c, and the conveying time $T_2$ is structured to be equal or smaller than the conveying time $T_1$.

Upstream sorting conveyor carry out detectors 23a, 23b and 23c for detecting the objects W in the outlet sides of the upstream sorting conveyors 15a, 15b and 15c and downstream sorting conveyor carry out detectors 25a, 25b and 25c for detecting the objects W in the outlet sides of the downstream sorting conveyors 17a, 17b and 17c are respectively provided, and further first conveying area carry out detectors 27a, 27b and 27c for detecting the objects W in the outlet sides of the first conveying areas 7a, 7b and 7c are respectively provided. In this structure, since the outlet sides of the upstream sorting conveyors 15a, 15b and 15c and the inlet sides of the downstream sorting conveyors 17a, 17b and 17c are arranged in a close relation, the upstream sorting conveyor carry out detectors 23a, 23b and 23c are used as downstream sorting conveyor brought in detectors for detecting the objects W in the inlet sides of the downstream sorting conveyors 17a, 17b and 17c disposed adjacent in the transverse direction. Further, since the first conveying areas 7a, 7b and 7c and the inlet sides of the upstream sorting conveyors 15a, 15b and 15c disposed adjacent in the transverse direction are respectively arranged in a close relation, the first conveying area carry out detectors 27a, 27b and 27c are used as upstream sorting conveyor brought in detectors for detecting the objects W in the inlet sides of the upstream sorting conveyors 15a, 15b and 15c disposed adjacent in the transverse direction. Furthermore, since the outlet sides of the downstream sorting conveyors 17a, 17b and 17c and the inlet sides of the second conveying areas 9a, 9b and 9c disposed adjacent in the transverse direction are respectively arranged in a close relation, the downstream sorting conveyor carry out detectors 25a, 25b and 25c are used as second conveying area brought in detectors for detecting the objects W in the inlet sides of the second conveying areas 9a, 9b and 9c disposed adjacent in the transverse direction. The carry out detectors 23a, 23b, 23c, 25a, 25b, 25c, 27a, 27b and 27c comprise, for example, photo-electric switches and reflecting mirrors.

Accordingly, for example, when the upstream sorting conveyor carry out detector 23a detects the object W or when the first conveying area carry out detector 27a detects the object W and thereafter the upstream sorting conveyor carry out detector 23a does not detect the same object W, the object W is determined to be positioned on the upstream sorting conveyor 15a. Alternatively, when the downstream sorting conveyor carry out detector 25a detects the object W, or when the upstream sorting conveyor carry out detector 23a detects the objects W and thereafter the downstream sorting conveyor carry out detector 25a does not detects the same object W, the object W is determined to be positioned on the downstream sorting conveyor 17a. Further, for example, when the upstream sorting conveyor carry out detector 23a detects the object W and thereafter does not detect it, the object W is determined to be carried out from the upstream sorting conveyor 15a. Simultaneously, for example, when the downstream sorting conveyor carry out detector 25a detects the object W and thereafter does not detect it, the objects W is determined to be carried out from the downstream sorting conveyor 17a.

Figure 6:
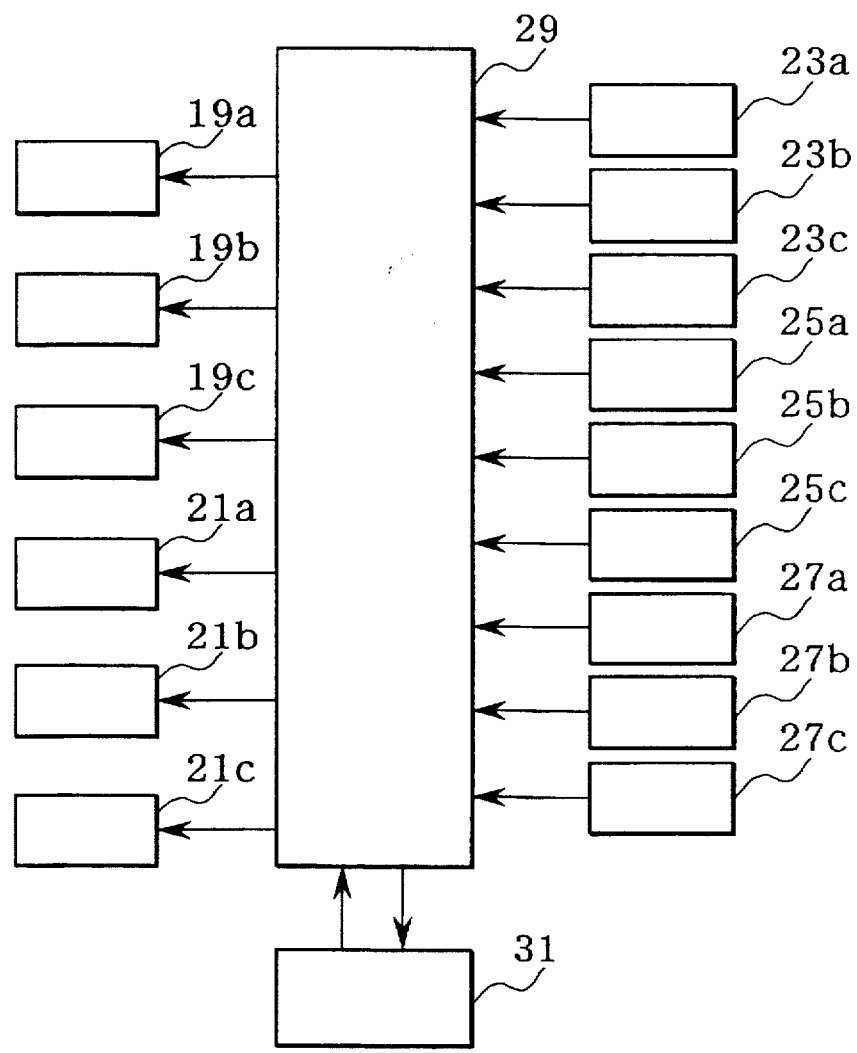
FIG. 6 is a block diagram with respect to the first aspect of the present invention.

Referring to FIG. 6, the driving motors 19a, 19b, 19c, 21a, 21b and 21c the carry out detectors 23a, 23b, 23c, 25a, 25b, 25c, 27a, 27b and 27c are connected to a control device 29 and an arithmetic unit 31 is connected to the control device 29. When the objects W are respectively positioned in the outlet side of the upstream sorting conveyors 15a, 15b and 15c disposed adjacent in the transverse direction under the state that the objects W are respectively positioned on the downstream sorting conveyors 17a, 17b and 17c, the control device 29 controls the corresponding driving motors 19a, 19b and 19c for the upstream sorting conveyor in such a manner as to stop their driving, and when the objects W are respectively carried out from the outlet side of the downstream sorting conveyor 17a, 17b and 17c, the control device 29 controls the corresponding driving motors 19a, 19b and 19c for the upstream sorting conveyors in such a manner as to start their driving again. Further, when the objects W are respectively positioned in the outlet side of the downstream sorting conveyors 17a, 17b and 17c, control device 29 controls the corresponding driving motors 21a, 21b and 21c for the downstream sorting conveyors in such a manner as to stop their driving, and the control device 29 also controls all the driving motors 21a, 21b and 21c for the downstream sorting conveyors in such a manner as to synchronously start their driving again. The arithmetic unit 31 operates respective average pitch times Tave required for average conveying pitches Pave between the objects W in the respective first conveying areas 7a, 7b and 7c in accordance with time intervals detected by the first conveying area carry out detectors 27a, 27b and 27c. Further, the average pitch time Tave is operated by the arithmetic unit 31 in many times during conveyance and strictly speaking the average pitch time Tave is not always constant during conveyance.

Figure 3:
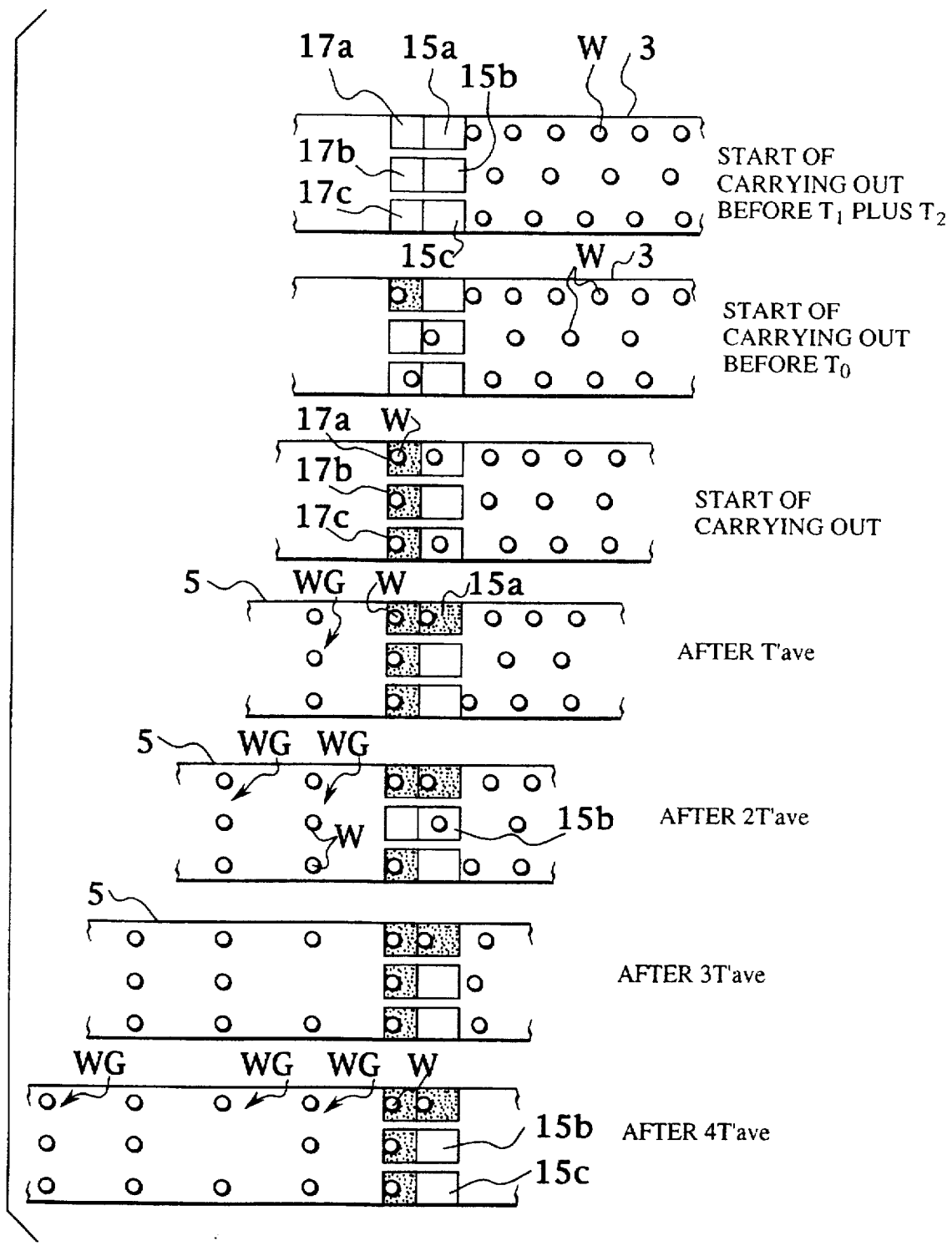
FIG. 3 is a drawing which shows periodical states carried out under a first predetermined carry out condition.

Here, the carry out conditions include the following three predetermined carry out conditions in accordance with the embodiments of the present invention. A first predetermined carry out condition is that the objects W are carried out when all the downstream sorting conveyors 17a, 17b and 17c are under a predetermined time interval substantially equal to the shortest average pitch time T'ave which is shortest among a plurality of average pitch times Tave (in this case the predetermined time interval may be shorter than the shortest average pitch time T'ave), which is shown in FIG. 3. (In the sorting conveyors shown in FIG. 3, dotted conveyors are in a condition of stopping the conveyance and conveyors without dots are in a condition of conveying.) A time To required for synchronously driving all the downstream conveyors 17a, 17b and 17c again after the objects W are positioned in the outlet side of any downstream sorting conveyors, for example, 17a is shown as follows.

$$T_0 = \frac{2 \times \text{Tave} - (T_1 + T_2)}{2}$$

Figure 4:
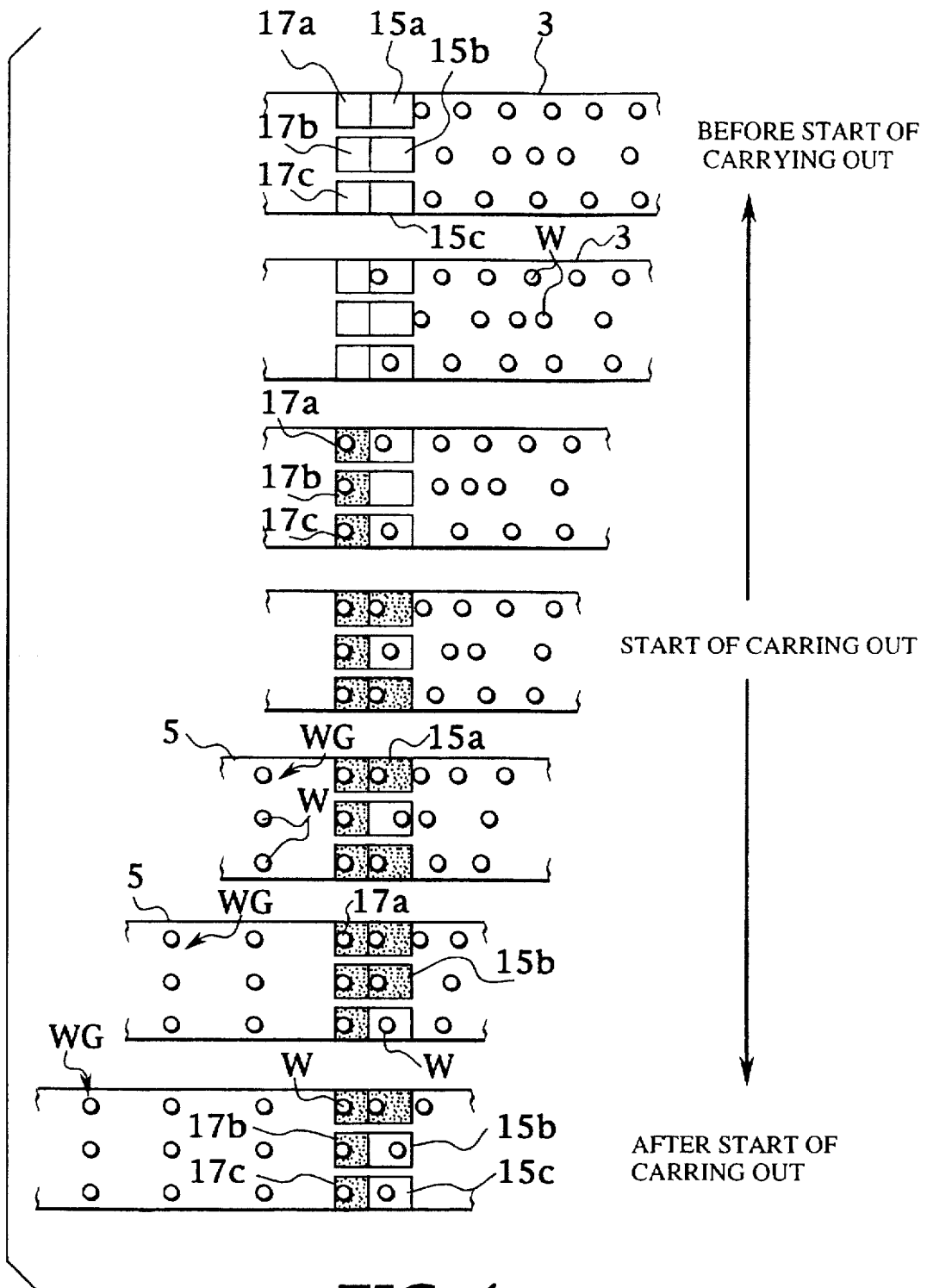
FIG. 4 is a drawing which shows periodical states carried out under a second predetermined carry out condition.

Further, a second predetermined carry out condition is that the objects W are carried out when the objects W are positioned in the outlet side of the first conveying area corresponding to any of the upstream sorting conveyors 15a, 15b and 15c under the condition that the objects W are positioned on the any of the upstream sorting conveyors, which is shown in FIG. 4. In the sorting conveyors shown in FIG. 4, dotted conveyors are in a stop condition and conveyors without dots are in a conveying condition.

Figure 5:
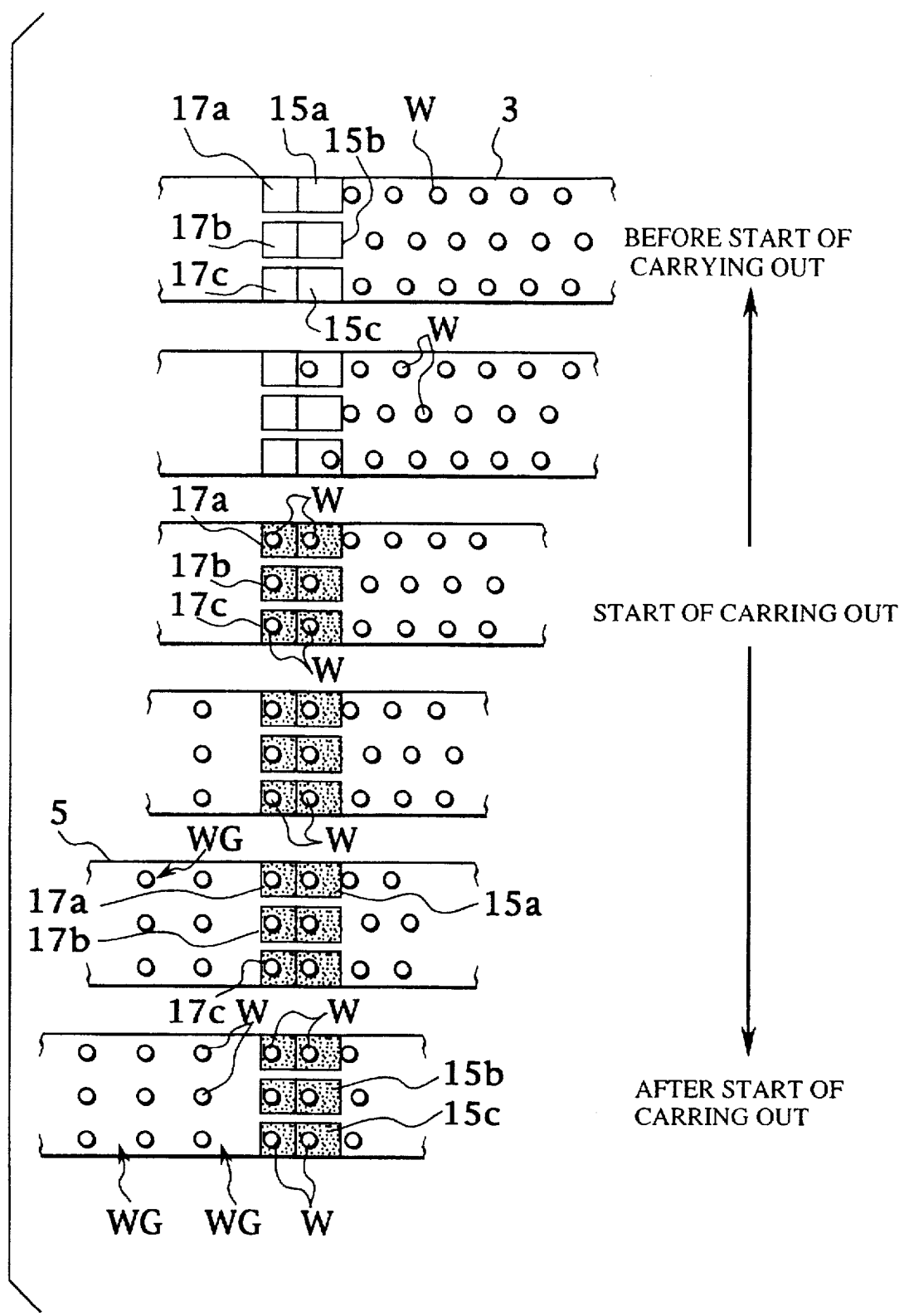
FIG. 5 is a drawing which shows periodical states carried out under a third predetermined carry out condition.

Furthermore, a third predetermined carry out condition is that the objects W are carried out when the objects W are respectively positioned in the outlet side of all the sorting conveyors 13a, 13b, 13c, 15a, 15b and 15c, which is shown in FIG. 5. In the sorting conveyors shown in FIG. 5, dotted conveyors are in a stop condition and conveyors without dots are in a conveying condition.

Next, operation of the embodiments in accordance with the present invention will be explained.

A lot of objects W are conveyed in the conveying direction under a state of a plurality of transverse rows by driving the first conveyor 3 and the objects W are continuously brought in the inlet side of the upstream sorting conveyors 15a, 15b and 15c from the outlet sides of the corresponding first conveying areas 7a, 7b and 7c. Then the driving motors 19a, 19b, 19c, 21a, 21b and 21c drive the sorting conveyors 15a, 15b, 15c, 17a, 17b and 17c, thereby continuously conveying the objects W from the inlet sides of the corresponding upstream sorting conveyors 15a, 15b and 15c to the outlet sides of the downstream sorting conveyors 17a, 17b and 17c.

In the above described steps conveyed by the sorting conveyors sets 13a, 13b and 13c, when the objects W are respectively positioned in the outlet sides of the upstream sorting conveyors 15a, 15b and 15c disposed adjacent in the transverse direction under the condition that the objects W are positioned on the downstream sorting conveyors 17a, 17b and 17c, the control device 29 controls the corresponding driving motors 19a, 19b and 19c in such a manner as to stop their driving. Further, when the objects W are carried out from the outlet side of the downstream sorting conveyor 17a, 17b and 17c, the control device 29 controls the corresponding driving motors 19a, 19b and 19c in such a manner as to start their driving again. In accordance with this, together with the conveying times $T_1$ and $T_2$ being shorter than the conveying time Tmin required for the minimum conveying pitch Pmin, there is no possibility that two or more objets W are positioned on each of the sorting conveyors 15a, 15b, 15c, 17a, 17b and 17c.

Further, when the objects W are positioned in the outlet side of the respective downstream sorting conveyors 17a, 17b and 17c, the control device 29 controls the corresponding driving motors 21a, 21b and 21c in such a manner as to stop their driving and controls all the driving motors 21a, 21b and 21c for the downstream sorting conveyors in such a manner as to synchronously start their driving again. By repeatedly performing this control, the objects W are continuously sorted into the groups WG of objects to be conveyed in the longitudinally direction and carried out from the outlet sides of the downstream sorting conveyors 17a, 17b and 17c. When the groups WG of the objects are carried out from the downstream sorting conveyors 17a, 17b and 17c, they are continuously brought in the second conveyor 5 and conveyed in the conveying direction on the second conveyor 5.

In this structure, under the first predetermined carry out condition, since the groups WG of the objects are carried out at the predetermined time intervals which is substantially equal to the shortest average pitch time T'ave as shown in FIG. 3, even if the conveying pitches between the objects W in one of the first conveying areas 7a, 7b and 7c are not equal to each other along the transverse direction, or even if the conveying pitches between the objects W in each of the first conveying areas 7a, 7b and 7c are not equal to each other, the respective groups WG of the objects can be continuously and certainly carried out and a lot of groups WG of the objects can be conveyed on the second conveyor 5 at a predetermined conveying pitches which are substantially equal to each other. Further, under the second predetermined carry out condition, since the objects W are carried out when the objects W are positioned in the outlet side of any of the first conveying areas, for example, 7a under the condition that the objects W are positioned on the corresponding upstream sorting conveyor, for example, 15a, even if the conveying pitches between the objects W in one of the first conveying areas 7a, 7b and 7c are not equal to each other along the transverse direction, or even if the conveying pitches between objects W for each of the first conveying areas 7a, 7b and 7c are not equal to each other, the respective groups WG of the objects can be continuously and certainly carried out and a time between stop of any one of the driving motors for the downstream sorting conveyors, for example, 21a and synchronously restart of all the driving motors 21a, 21b and 21c for the downstream sorting conveyors becomes long so that the objects W have a great possibility of waiting in the outlet side of all the downstream side conveyors 17a, 17b and 17c. Further, under the third predetermined carry out condition, only in the case that the conveying pitches between the objects W in one of the first conveying areas 7a, 7b and 7c are substantially equal to each other along the transverse direction and the conveying pitches between the objects W for each of the first conveying areas 7a, 7b and 7c are substantially equal to each other, the respective groups WG of the objects can be continuously carried out to the second conveyor 5 at a substantially constant time interval so that a lot of groups WG of the objects can be conveyed on the second conveyor 5 at a substantially constant conveying pitch.

In accordance with the first embodiment of the present invention, when the objects W are respectively positioned in the outlet sides of the downstream sorting conveyors 17a, 17b and 17c, the driving motors 21a, 21b and 21c for the respective downstream sorting conveyors are stopped an all the driving motors 21a, 21b and 21c for the downstream sorting conveyors are synchronously restarted under the predetermined carry out condition, thereby continuously sorting the respective groups WG of the objects in a line which is parallel to the longitudinal direction without bumping the objects W against the sorting shutter and the like. Accordingly, even if the objects W are soft, deformation due to sorting can be prevented and a quality of the objects W is maintained. Further, even if the distance or interval between the groups WG of the objects to be sorted in the longitudinal direction on the first conveyor 3 is small, a certain sorting can be performed.

Further, when the objects Ware respectively positioned in the outlet sides of the upstream sorting conveyors 15a, 15b and 15c disposed adjacent in the transverse direction under the condition that the objects W are respectively positioned in the outlet sides of the downstream sorting conveyors 17a, 17b and 17c, the driving motors 19a, 19b and 19c for the corresponding upstream sorting conveyors are stopped and are restarted when the objects W are carried out from the outlet sides of the downstream sorting conveyors 17a, 17b and 17c, furthermore the conveying time T1 and T2 are made to be shorter than the conveying time Tmin required for the shortest conveying pitch Pmin so that there is no possibility that two or more objects are positioned on the respective sorting conveyors 15a, 15b, 15c, 17a, 17b and 17c. Accordingly, interference between the objects W in the respective sorting conveyors 15a, 15b, 15c, 17a, 17b and 17c can be certainly prevented, the sorting operation can be improved and the quality of the objects W is maintained.

In accordance with the first predetermined carry out condition, even if the conveying pitches between the objects W in one of the first conveying areas 7a, 7b and 7c are not equal to each other along the transverse direction, or even if the conveying pitches between the objects W for each of the first conveying areas 7a, 7b and 7c are not equal to each other, the objects W can be continuously and certainly sorted into the respective groups WG of the objects, thereby improving the sorting operation. Further, a lot of groups WG of the objects can be conveyed on the second conveyor 5 at a substantially constant predetermined conveying pitch, thereby improving the after treatment of the objects W in the outlet side of the second conveyor 5.

In accordance with the second predetermined carry out condition, even if the conveying pitches between the objects W in one of the first conveying areas 7a, 7b and 7c are not equal to each other along the transverse direction, or even if the conveying pitches between the objects W for each of the first conveying areas 7a, 7b and 7c are not equal to each other, the objects W can be continuously and certainly sorted into the respective groups WG of the objects, thereby improving the sorting operation. Further, a time between stop of any one of the driving motors for the downstream sorting conveyors and synchronous restart of all the driving motors 21a, 21b and 21c for the downstream sorting conveyors becomes long so that the objects W have a great possibility of waiting in the outlet side of all the downstream side conveyors 17a, 17b and 17c. Accordingly, there is a little possibility that the groups WG of the objects carried out to the second conveyor 5 comprise one object W, thereby improving the after treatment of the objects W in the outlet side of the second conveyors 5.

Further, in accordance with the third predetermined carry out condition, only in the case that the conveying pitches between the objects W in one of the first conveying areas 7a, 7b and 7c are substantially equal to each other along the transverse direction and the conveying pitches between the objects W for each of the first conveying areas 7a, 7b and 7c are equal to each other, the groups WG of the objects can be continuously carried out from the downstream sorting conveyors 17a, 17b and 17c at a substantially constant time intervals, a lot of groups WG of the objects can be conveyed in the second conveyor 5 at a substantially constant conveying pitch and the after treatment of the objects W can be improved in the outlet side of the second conveyor 5.

In the above described embodiments of the present invention, each of the sorting conveyors sets 13a, 13b and 13c is provided with two sorting conveyors 15a, 15b, 15c and 17a, 17b, 17c, respectively. However, each of the sorting conveyors sets may be provided with three or more sorting conveyors.

Figure 7:
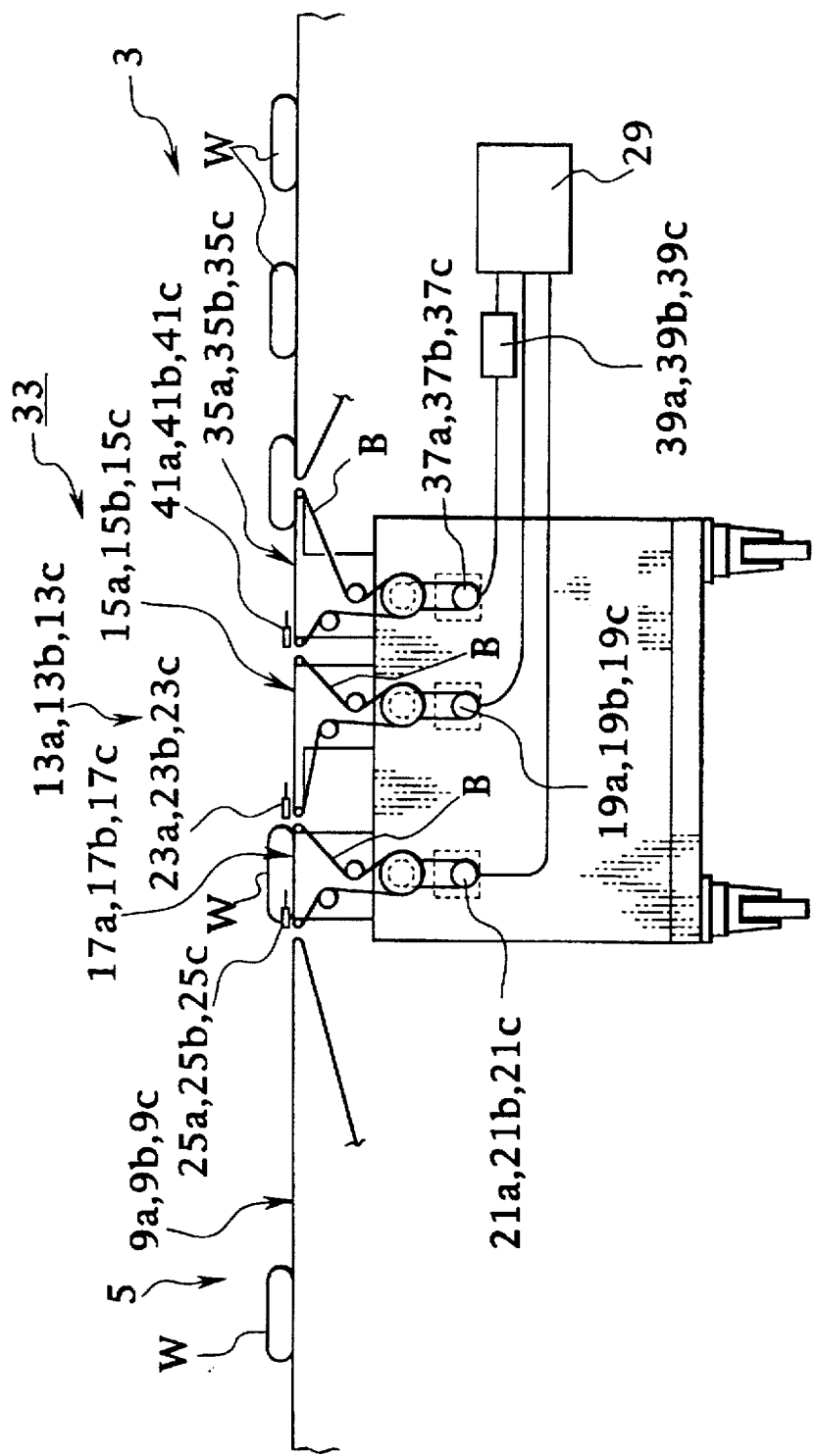
FIG. 7 is a front view showing a sorting conveyor apparatus in accordance with a second embodiment of the present invention.

Next, a sorting conveyor apparatus 33 in accordance with a second embodiment of the present invention will be explained with reference to FIG. 7. The sorting conveyor apparatus 33 has substantially the same structure of the sorting conveyor apparatus 1 described above, in the drawing the same reference numerals are attached to the same elements, an the explanation thereof is omitted.

A plurality of upstream side variable speed conveyors 35a, 35b and 35c are provided between the first conveyor 3 and a plurality of upstream sorting conveyors 15a, 15b and 15c in the sorting conveyor apparatus 33 in a longitudinal direction, that is, an inside and outside direction with respect to a drawing sheet and each of the upstream side variable speed conveyors 35a, 35b and 35c is structured to be arranged between the corresponding first conveying areas 7a, 7b and 7c and the upstream sorting conveyors 15a, 15b and 15c. The sorting conveyors sets body 11 is provided with driving motors 37a, 37b and 37c for the upstream side variable speed conveyors for driving the belts B of respective upstream side variable speed conveyors 35a, 35b and 35c, and the respective driving motors 37a, 37b and 37c are connected to the control device 29 through speed change devices 39a, 39b and 39c. Each of the speed change devices 39a, 39b and 39c operates to switch the conveying speed of the belt B in each of the upstream side variable speed conveyors 35a, 35b and 35c, that is, running speed between a speed substantially equal to the conveying speed of the belt B in the first conveyor 3 and a speed substantially equal to the conveying speed of the belt B in the upstream sorting conveyors 15a, 15b and 15c.

In the second embodiment of the present invention, instead of the first conveying area carry out detectors 27a, 27b and 27c, upstream side variable speed conveyor carry out detectors 41a, 41b and 41c for detecting whether or not the objects W are positioned in the outlet sides of the respective upstream side variable speed conveyors 35a, 35b and 35c.

Accordingly, the objects W are respectively brought in the inlet sides of the upstream side variable speed conveyors 35a, 35b and 35c by driving the first conveyors 3 under the condition of switching the conveying speed of the belt B in the upstream side variable speed conveyors 35a, 35b and 35c into a speed substantially equal to the conveying speed of the belt B in the first conveyor 3. Further, when the carry out detectors 41a, 41b and 41c for the upstream side variable speed conveyors detect that the objects W are positioned in the outlet sides of the corresponding upstream side variable speed conveyors 35a, 35b and 35c, the control device 29 switches the conveying speed of the belt B in the corresponding upstream side variable speed conveyors 35a, 35b and 35c into a speed substantially equal to the conveying speed of the belt B in the upstream sorting conveyors 15a, 15b and 15c, respectively and the objects W are brought in the inlet sides of the corresponding upstream sorting conveyors 15a, 15b and 15c. After the objects W are brought in the inlet side of each of the upstream sorting conveyors 15a, 15b and 15c, the conveying speed of the belt B in the corresponding upstream variable speed conveyors 35a, 35b and 35c is switched to the speed substantially equal to the conveying speed of the belt B in the first conveyor 3.

In accordance with the second embodiment of the present invention, in addition to the above described effect of the first embodiment of the present invention, since the conveying speed of the objects W is not changed between the conveyors when the objects W are carried out from the first conveyor 3 to the upstream sorting conveyors 15a, 15b and 15c, the deformation of the objects W is prevented between the conveyors even if the objects W are soft, thereby maintaining the quality of the objects to be conveyed.

Next, a sorting conveyor apparatus 43 in accordance with a third embodiment of the present invention will be explained below. The sorting conveyor apparatus 43 has the substantially the same structure of the sorting conveyor apparatus 1 described above, in the drawing the same reference numerals are attached to the same elements, and the explanation thereof is omitted.

Figure 8:
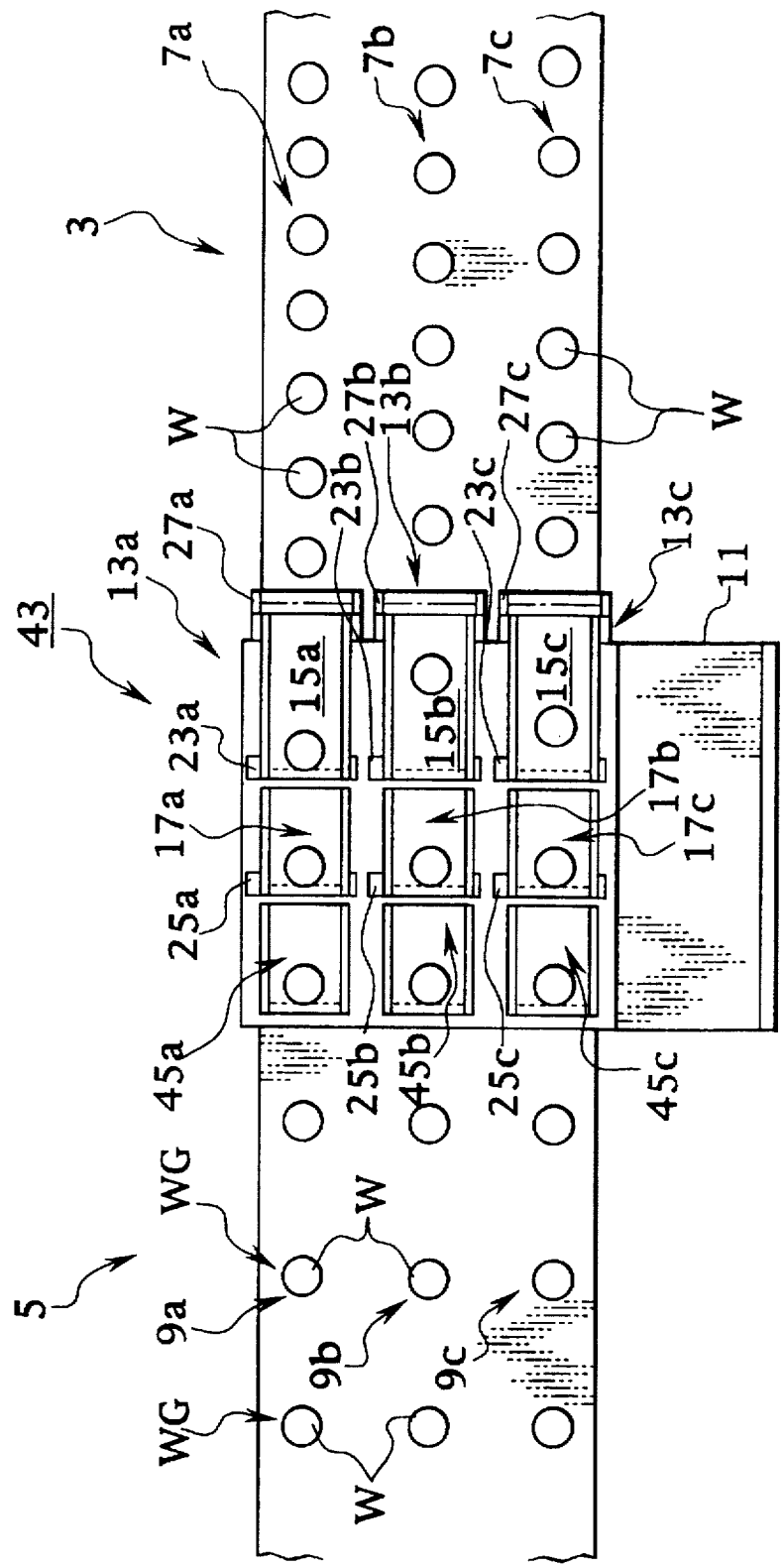
FIG. 8 is a plan view showing a sorting conveyor apparatus in accordance with a third embodiment of the present invention.
Figure 9:
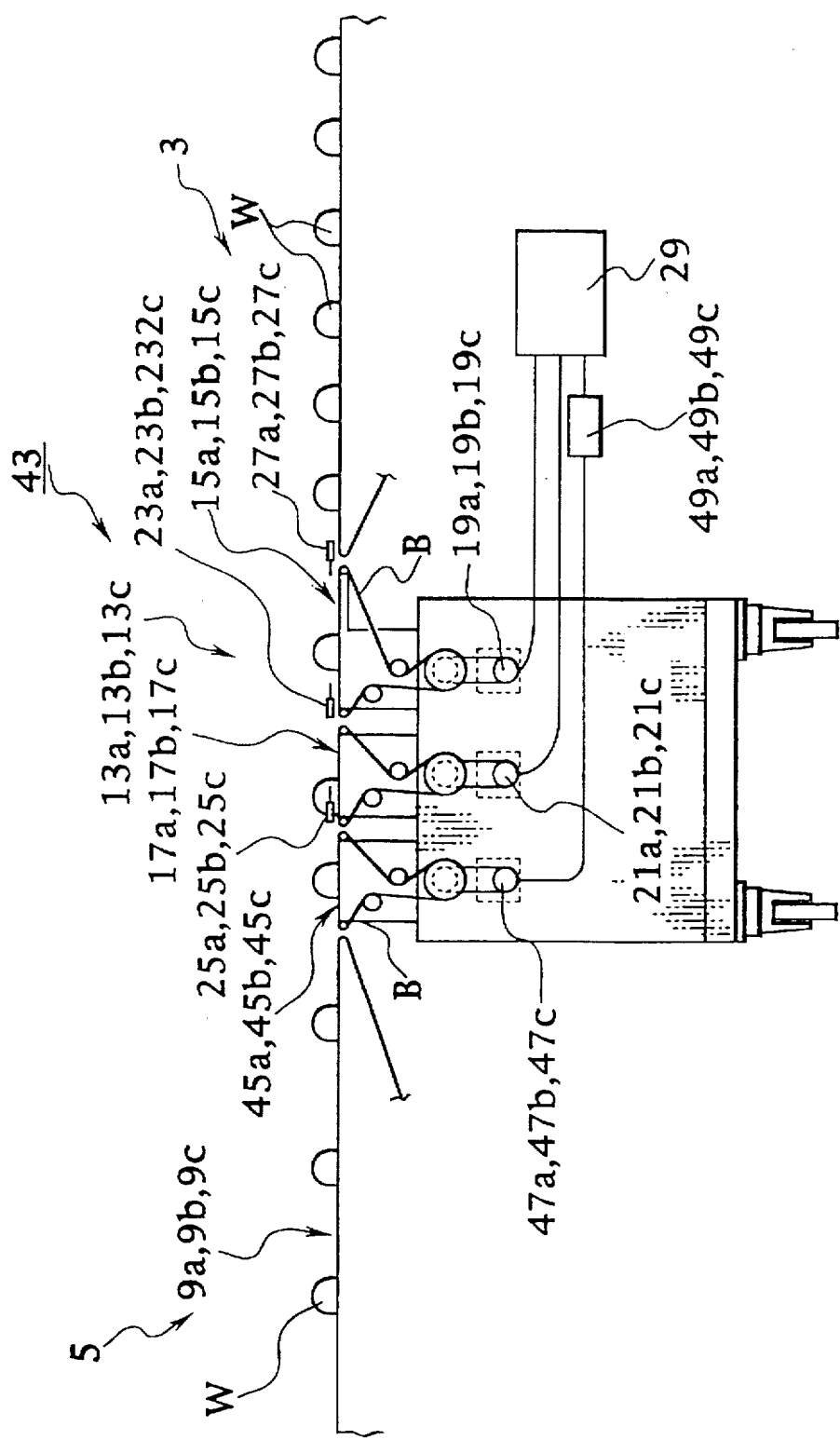
FIG. 9 is a front view showing the sorting conveyor apparatus in accordance with the third embodiment of the present invention.

A plurality of downstream side variable speed conveyors 45a, 45b and 45c are provided between the second conveyor 5 and the downstream sorting conveyors 17a, 17b and 17c in the longitudinal direction, that is, an up and down direction in FIG. 8 and an inside and outside direction with respect to a drawing sheet in FIG. 9 and each of the downstream side variable speed conveyors 45a, 45b and 45c is structured such as to be arranged between the corresponding second conveying areas 9a, 9b and 9c and the downstream sorting conveyors 17a, 17b and 17c. The sorting conveyors sets body 11 is provided with driving motors 47a, 47b and 47c for the downstream side variable speed conveyors for driving the belt B in each of the downstream side variable speed conveyors 45a, 45b and 45c and each of the downstream side variable speed conveyors driving motors 47a, 47b and 47c is connected to the control device 29 through speed change devices 49a, 49b and 49c. In this structure, each of the speed change devices 49a, 49b and 49c is structured in such a manner as to switch the conveying speed, that is, running speed of the belt B in the corresponding downstream side variable speed conveyor 45a, 45b and 45c between a speed substantially equal to the conveying speed of the belt B in the second conveyor 5 and a speed substantially equal to the conveying speed of the belt B in the downstream sorting conveyors 17a, 17b and 17c.

Accordingly, just before synchronously restarting all the downstream sorting conveyors driving motors 21a, 21b and 21c again under the predetermined carry out conditions, the conveying speed of the belt B in each of the downstream side variable speed conveyors 45a, 45b and 45c is switched to the conveying speed substantially equal to the conveying speed of the belt B in the downstream sorting conveyors 17a, 17b and 17c, and the objects W are respectively brought in the inlet sides of the downstream side variable speed conveyors 45a, 45b and 45c. After the objects W are brought in, that is, a predetermined time period has passed after all the downstream sorting conveyors driving motors 21a, 21b and 21c are synchronously restarted, the conveying speed of the belt B in all the downstream side variable speed conveyors 45a, 45b and 45c is switched to the speed substantially equal to the conveying speed of the belt B in the second conveyor 5. Then under this condition, each of the upstream side variable speed conveyors 45a, 45b and 45c is driven to convey and the objects W are brought in the second conveyor 5.

In accordance with the above described third embodiment of the present invention, in addition to the effects obtained by the first embodiment of the present invention, since the conveying speed of the objects W is not changed between the conveyors when the objects W are carried out from the downstream sorting conveyors 17a, 17b and 17c to the second conveyor 5, the deformation of the objects W can be prevented even if the objects W are soft, thereby maintaining the quality of the objects W. Further, even if the conveying speed of the belt B in the downstream sorting conveyors 17a, 17b and 17c is significantly slower than the conveying speed of the belt B in the second conveyor 5, the objects W can be carried out to the second conveyor 5 at a speed substantially equal to the conveying speed of the belt B in the second conveyor 5 so that the conveying pitch of the groups WG of the objects in the second conveyor 5 can be reduced, thereby improving the after treatment of the objects W in the outlet side of the second conveyor 5.

Further, the sorting conveyor apparatus 41 may be provided with the upstream side variable speed conveyors 35a, 35b and 35c and the like.

While preferred embodiments of the present invention have been described using specific terms, such description is for illustrative purposes, and it is to be understood that changes and variations may be made without departing from the spirit or scope of the following claim.

What is claimed is:

1. A sorting conveyor apparatus for continuously sorting objects to be conveyed into groups and conveying the objects comprising:

a first conveyor disposed upstream of a transverse direction for conveying the objects, said first conveyor having a plurality of first conveying areas for conveying a lot of objects under a condition of rows in said transverse direction, in a longitudinal direction which is crossed to said transverse direction;

a second conveyor disposed downstream of said transverse direction, said second conveyor having a plurality of second conveying areas for conveying a lot of objects under a condition of rows in said transverse direction, in said longitudinal direction;

a sorting conveyors set disposed between said first conveyor and said second conveyor, said sorting conveyors set having a plurality of upstream sorting conveyors disposed in said longitudinal direction and a plurality of downstream sorting conveyors disposed in said longitudinal direction, said plurality of upstream sorting conveyors corresponding to said plurality of first conveying areas of said first conveyor in the longitudinal direction and said plurality of downstream sorting conveyors corresponding to said plurality of second conveying areas of said second conveyor in the longitudinal direction; and a control device for individually controlling said plurality of upstream sorting conveyors and said plurality of downstream sorting conveyors, wherein said control device controls in such a manner as to stop driving of each of said upstream sorting conveyors disposed adjacent in the transverse direction when each of the objects is positioned in outlet sides of said upstream sorting conveyors disposed adjacent in the transverse direction under a condition that the objects are positioned on said plurality of respective downstream sorting conveyors and to restart driving of each of said adjacent upstream sorting conveyors again when each of the objects is carried out from outlet sides of said downstream sorting conveyors, and said control device also controls in such a manner as to stop driving of each of said downstream sorting conveyors when each of the objects is positioned in the outlet sides of said plurality of downstream sorting conveyor and to synchronously restart driving of all the downstream sorting conveyors under a predetermined carry out condition.

2. A sorting conveyor apparatus according to claim 1, wherein a conveying time for conveying the objects from an inlet side to said outlet side of said upstream and downstream sorting conveyors is shorter than a conveying time required for a minimum conveying pitch between the objects in said first conveying areas.

3. A sorting conveyor apparatus according to claim 1, further comprising an arithmetic device for operating respective average pitch times required for average conveying pitches of the objects in said each of the first conveying areas, wherein said predetermined carry out condition is to drive all the most downstream sorting conveyors at a predetermined time period not longer than the shortest average pitch time among a plurality of average pitch times.

4. A sorting conveyor apparatus according to claim 1, wherein said predetermined carry out condition is to drive all the most downstream sorting conveyors when the objects are positioned in outlet sides of the first conveying areas corresponding to any of a plurality of most upstream sorting conveyors under a condition that the objects are positioned on said any of the most upstream sorting conveyors.

5. A sorting conveyor apparatus according to claim 1, wherein said predetermined carry out condition is to drive all the most downstream sorting conveyors when the objects are respectively positioned in the outlet sides of all said sorting conveyor.

6. A sorting conveyor apparatus according to claim 1, further comprising:
- a sorting conveyor brought in detector for detecting whether or not the objects are positioned in the inlet side of said each of the sorting conveyors;
- a sorting conveyor carry out detector for detecting whether or not the objects are positioned in the outlet side of said each of the sorting conveyors;
- a first conveying areas carry out detector for detecting whether or not the objects are positioned in an outlet side of said each of the first conveying areas; and
- a second conveying areas carry out detector for detecting whether or not the objects are positioned in an inlet side of said each of the second conveying areas.

7. A sorting conveyor apparatus according to claim 1, further comprising:
- a plurality of upstream side variable speed conveyors disposed between said first conveyor and said plurality of most upstream sorting conveyors in the longitudinal direction, wherein each of said upstream side variable speed conveyors are structured in such a manner as to be disposed between the corresponding first conveying area and the most upstream sorting conveyor and a conveying speed of each of the upstream side variable speed conveyors can be switched between a speed substantially equal to a conveying speed of the first conveyor and a speed substantially equal to a conveying speed of the most upstream sorting conveyor.

8. A sorting conveyor apparatus according to claim 1, further comprising:
- a plurality of downstream side variable speed conveyors disposed between said second conveyor and said plurality of most downstream sorting conveyors in the longitudinal direction, wherein each of said downstream side variable speed conveyors are structured in such a manner as to be disposed between the corresponding second conveying area and the most downstream sorting conveyor and a conveying speed of each of the downstream side variable speed conveyors can be switched between a speed substantially equal to a conveying speed of the second conveyor and a speed substantially equal to a conveying speed of the most downstream sorting conveyor.

* * * * *